United States Patent [19]
Amstutz

[11] Patent Number: 5,507,470
[45] Date of Patent: Apr. 16, 1996

[54] SPRING COMPRESSOR

[76] Inventor: Peter Amstutz, Box 207, North Lancaster, Ontario, Canada, K0C 1Z0

[21] Appl. No.: 361,197
[22] Filed: Dec. 21, 1994
[51] Int. Cl.⁶ .................................................. B23P 19/04
[52] U.S. Cl. ............................................ 254/10.5; 29/227
[58] Field of Search ............................. 254/10.5; 29/227, 29/215–218, 225–227, 251, 252

[56] References Cited

U.S. PATENT DOCUMENTS

| | | |
|---|---|---|
| Re. 34,097 | 10/1992 | Kloster . |
| 2,948,057 | 8/1960 | Dagenais ................................ 254/10.5 |
| 3,814,382 | 6/1974 | Castoe . |
| 3,902,698 | 9/1975 | Furrer et al. . |
| 4,105,188 | 8/1978 | Mendoza et al. . |
| 4,219,918 | 9/1980 | Klann . |
| 4,395,020 | 7/1983 | Spainhour ................................ 29/227 |
| 4,641,814 | 2/1987 | Lala et al. ................................ 29/227 |
| 4,736,505 | 4/1988 | Vanbeber . |
| 5,031,294 | 7/1991 | Krueger . |
| 5,172,889 | 12/1992 | Post et al. ................................ 254/10.5 |

Primary Examiner—Robert C. Watson

[57] ABSTRACT

A spring compressor having a vertical post with a movable spring mount on the middle part of the post and a fixed spring mount on the upper part of the post. A self-contained, hydraulic jack is mounted between the movable spring mount and the lower part of the post or a base supporting the post. The jack is operable to move the the movable spring mount up toward the fixed spring mount to compress a spring between them. The fixed spring mount can be adjustably mounted on the upper part of the post. Each spring mount has a pair of support arms. There is a spring engaging hook at the end of each arm. The arms on each mount are movable toward or away from each other and are also swingable in a vertical plane so that they can be easily mounted on a spring. Adjustable stops are also provided for limiting upward movement of the arms on the fixed spring mount and for limiting downward movement of the arms on the movable spring mount.

17 Claims, 3 Drawing Sheets

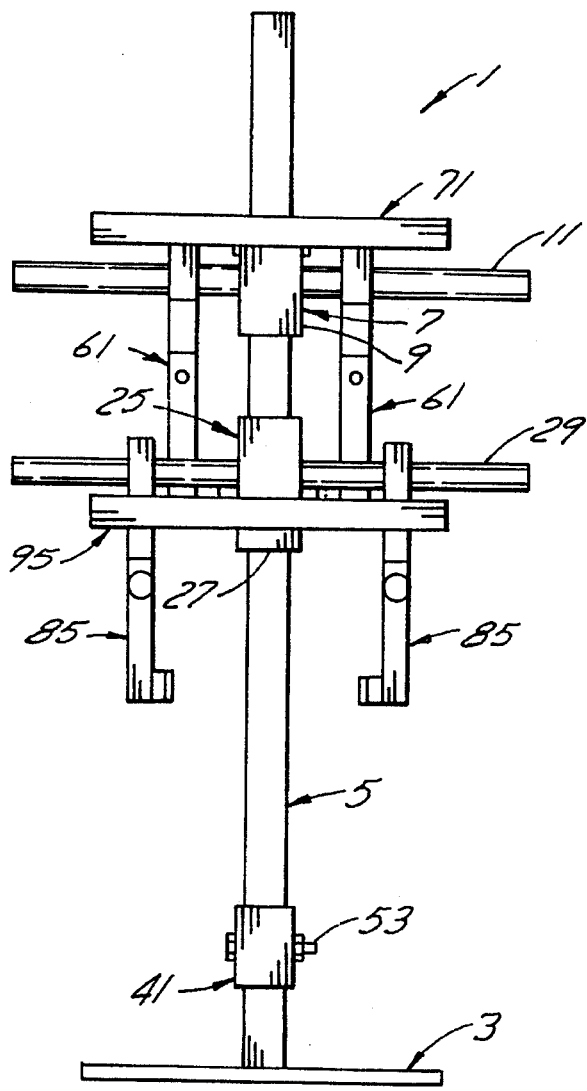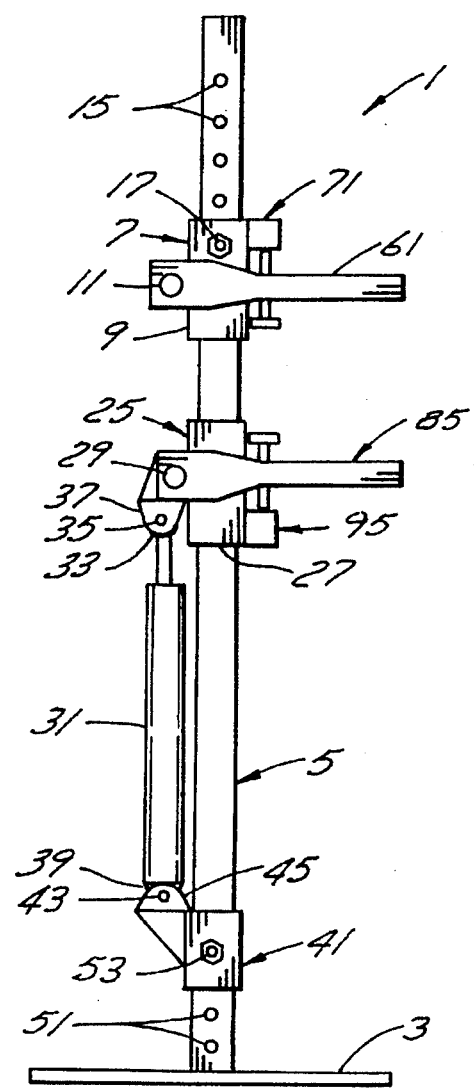
FIG. 1
FIG. 3

SPRING COMPRESSOR

BACKGROUND OF THE INVENTION

1. Field of the Invention

This invention is directed toward an improved spring compressor.

The invention is more particularly directed toward an improved spring compressor for use in servicing MacPherson strut assemblies which assemblies are used in car suspensions.

2. Description of the Related Art Including Information Disclosed Under CFR SS 1.97–1.99

MacPherson strut assemblies comprise a shock absorber mounted within a coil spring. The shock absorber has a bottom spring plate fixed to it, intermediate its ends. A top mounting plate is detachably connected to the top end of the shock absorber. The coil spring is mounted, under compression, between the bottom spring plate and the top mounting plate.

The shock absorber in the strut assembly often needs replacement. To replace the shock absorber it is neceessary to first additionally compress the spring to take the load off the top mounting plate, to then disconnect the top mounting plate from the shock absorber, and to the withdraw the shock absorber from within the spring. A new shock absorber is then inserted into the spring, the top mounting plate is connected to the new shock absorber and the spring is decompressed to be held, still under some compression, between the top mounting plate and the bottom spring plate on the new shock absorber. Often, the top mounting plate must also be replaced at the same time as the shock absorber because of rusting, or because of wear of a bushing employed with the top mounting plate.

The tool most commonly used in changing the shock absorber in a MacPherson strut assembly is a spring compressor that employs two threaded rods. Each rod carries a pair of opposed, facing hook members on it. To employ the compressor, the rods are placed on diametrically opposed sides of the coil spring on the strut assembly, parallel to its longitudinal axis. The facing hook members on each rod are placed over a section of a coil of the spring so as to loosely grip a substantial portion of the spring between them. The rods are now alternatively turned to draw the hook members on each rod toward each other to compress the mid-section of the spring between them. Once the mid-section of the spring has been compressed, the top mounting plate can be disconnected from the shock absorber and the shock absorber can be withdrawn from the spring. An example of such a spring compressor is shown in U.S. Pat. No. Re. 34,097. This type of spring compressor is simple and inexpensive. It is safe. It allows the shock absorber to be removed without having to release the spring. It also allows the top mounting plate to be replaced, if needed, without having to release the spring. It can be used on any size of spring. However this type of compressor is very, very slow to use because of the thread mechanism used to draw the hook members together, and because two rods, each with a thread, are employed. Also, the compressor is subjected to a lot of wear because of the load on the threads, particularly if a power wrench is employed to try to speed up the spring compressing and decompressing operation, and this wear, resulting in loose hook members, may cause the compressor to become unsafe to use.

In an attempt to reduce the time it takes to change the shock absorber on a MacPherson strut assembly it is known to provide spring compressors which use fluid moving means such as a pneumatic cylinder in place of the threaded rods. Examples of such spring compressors are shown in U.S. Pat. Nos. 3,814,382 and 4,395,020 by way of example. These compressors normally employ platens with one platen being fixed and the other movable. The strut assembly is mounted in the compressor with the bottom spring plate on the assembly on the fixed platen and with the top platen hooked over the top of the spring just below the top mounting plate. Movement of the top platen by the air cylinder will compress the spring allowing the top mounting plate to be disconnected. The air cylinder is moved again in the opposite direction to now release the spring so that the shock absorber can be replaced. Once the shock absorber is replaced, the spring is compressed again so that the top mounting plate can be reconnected to the shock, and the spring is then again released leaving it compressed between the top mounting plate and the bottom spring plate. However, the double compression and release operations still take time. In addition, the use of an air cylinder requires an air compressor making the spring compressor more expensive and not self contained. Platens are used with a single fluid cylinder since they apply pressure generally equally on both sides of the spring at each end and since they can be used with different sizes of springs. However, the platens have a disadvantage in that it is very difficult to mount the strut assembly between them, particularly at the top of the assembly because of the angle of the spring coils. More difficulty is encountered in mounting assemblies between the platens because the assemblies have springs have various diameters and angles. The use of air cylinders can also make it difficult to load the assemblies because of their quick jerky movements in positioning the movable platen. In addition, the platens are not as safe as hooks in holding the assembly while the spring is compressed and additional means must be employed to ensure that the spring does not pop out from between the platens when compressed.

A spring compressor that makes it easier to load the strut assembly, and that also uses hooks on the upper platen to hold the spring, is shown in U.S. Pat. No. 5,031,294. In this patent, in which the strut assembly is mounted upside down, the lower end of the spring adjacent the bottom spring plate, is held by two hook members, each mounted on an arm. The arms in turn are mounted on a frame in a manner allowing them to be moved toward or away from each other. In addition, the frame can be tilted about a vertical support post. This arrangement permits easier loading of the strut assembly, at least at one end, and, in using hook members at the top, makes the compressor somewhat safer. However, the use of a platen on the lower end still makes it difficult to mount the assembly and also the assembly is still somewhat unsafe because the assembly is not as securely held at its lower end. In addition, the spring must be fully decompressed in order to replace the top plate. It is noted that this compressor uses a screw member to apply pressure. The use of the screw mwmber makes it easier to load the strut assembly since there can be fine adjustment of the frame. However, the use of the screw assembly makes this compressor very slow to use.

SUMMARY OF THE INVENTION

It is the purpose of the present invention to provide an improved spring compressor that avoids or minimizes the disadvantages of the known spring compressors. More particularly, it is the purpose of the present invention to provide a spring compressor that is self contained; that is fast in operation; that is easy to load and unload; that can be used to quickly change shock absorbers, springs and/or top plates in MacPherson strut assemblies; that can work with springs of various size; that locates the springs at a proper working height; and, most importantly, is safer in operation.

In accordance with the present invention there is provided a spring compressor having a post extending vertically up from a base. Top spring mounting means are mounted on the post. Coil spring engaging means are provided on the top spring mounting means. Bottom spring mounting means are slidably mounted on the post below the top spring mounting means. Coil spring engaging means are provided on the bottom spring mounting means. A self-contained, hydraulic jack is mounted below the bottom spring mounting means, connected between the bottom spring mounting means and the post or base. Operation of the jack moves the bottom spring mounting means towards the top spring mounting means to compress a spring mounted between their coil spring engaging means. The top and bottom spring mounting means are at waist height making it easy to work with the compressor and a MacPherson strut assembly. The compressor is self-contained and can be used anywhere without the need of an air compressor or a hydraulic pump. The compressor is fast in operation. Since the jack is below the work station, a release of hydraulic pressure in the jack will allow the spring and gravity to decompress the spring making it quick and easy to unload.

The top spring mounting means preferably is constructed to be fixed at one of a plurality of selected positions on the upper part of the vertical post. This permits the top spring mounting means to be moved up the post from a normal shock absorber changing position, where only a short stroke of the jack is needed, to a higher position where the spring can be changed, and where a longer stroke of the jack is needed.

Each spring mounting means has a sleeve adapted to be slidably mounted on the post with a horizontal, cylindrical cross bar on the sleeve. A pair of mounting arms are mounted at one end on the cross bar. The arms are slidable on the cross bar toward or away from each other, and each can also rotate on the cross bar in a vertical plane. The top arms each have coil spring engaging means in the form of a downwardly facing hook at their other free end and the bottom arms each have coil spring engaging means in the form of an upwardly facing hook at their other free end. Top stop means are provided on the top spring mounting means for limiting upward, rotational movement of the arms. Bottom stop means are provided on the bottom spring mounting means for limiting downward rotational movement of the bottom arms.

In use, the bottom arms can be moved toward or away from each other to have the hooks on these arms fit the size of the spring being worked on. The strut assembly is the placed on the bottom spring mounting means with a lower coil of the coil spring on the strut assembly resting on the hooks. The bottom stop means at this time holds the bottom arms generally horizontal and the hydraulic jack, in the retracted position, holds the bottom arms, through the bottom spring mounting means, at a suitable working level. With the strut assembly now supported upright on the bottom arms, the top arms can be individually moved inwardly, and up or down slightly about the cross bar to place the hooks on their ends on an upper coil of the spring. The upper stop means allows for some vertical movement of these upper arms while fitting their hooks on the coil. Thus a portion of the coil spring is easily loaded between the hooks on the upper and lower arms. The loading is done by the operator at torso height and is quick and manual. Once the coil spring is hooked up, the jack is operated manually to move the bottom spring mounting means upwardly toward the top spring mounting means so as to compress the hooked portion of the coil spring to allow a shock to be replaced. As the bottom spring mounting means is moved upwardly, the upper stop means prevents upward movement of the top arms. The hooks on the top and bottom arms securely hold the spring in place. Once the shock is replaced, the pressure on the jack is released and the force of the spring will push the bottom spring mounting means down to its start position.

The strut assembly is easily worked on while the spring is compressed. There is lots of clearance for the shock on the strut assembly above and below the arms. The bottom location of the jack and the adjustability of both the top spring mounting means and the one end of the jack allow the working space between the arms to be quickly and easily increased if a spring instead of a shock needs replacing.

The invention is particularly directed toward a spring compressor having a base and a vertical post extending up from the base. A top spring mounting means is mounted on the upper portion of the post and a bottom spring mounting means is slidably mounted on the middle part of the post. Coil spring engaging means are provided on each spring mounting means. A self-contained hydraulic jack, extending generally parallel to the post, is mounted at one end on one of the base and the lower part of the post and at its other end to the bottom spring mounting means. The jack is operable to move the bottom spring mounting means toward the top spring mounting means to compress a spring held between their coil spring engaging means.

The invention is also particularly directed toward a spring compressor having a vertical support post, a top spring mounting means fixed on the post and a bottom spring mounting means slidably mounted on the post. The top spring mounting means has a top support bar extending transverse to the post and a pair of top support arms on the top support bar, one on either side of the post. The top support arms are slidable on the bar toward or away from each other. The bottom spring mounting means also has a bottom support bar extending transverse to the post and a pair of bottom support arms on the bottom support bar, one on either side of the post. The bottom support arms are also slidable on the bottom support bar toward or away from each other. The top and bottom support arms have coil spring engaging means on their outer ends for engaging a section of the coil spring. Means are provided, when a section of coil spring is mounted between the coil engaging means on the arms, for moving the bottom spring mounting means toward the top spring mounting means to compress the section of coil spring.

BRIEF DESCRIPTION OF THE DRAWINGS

FIG. 1 is a front view of the spring compressor when not in use;

FIG. 3 is a side view of the spring compressor in use;

DESCRIPTION OF THE PREFERRED EMBODIMENTS

Figure 2:
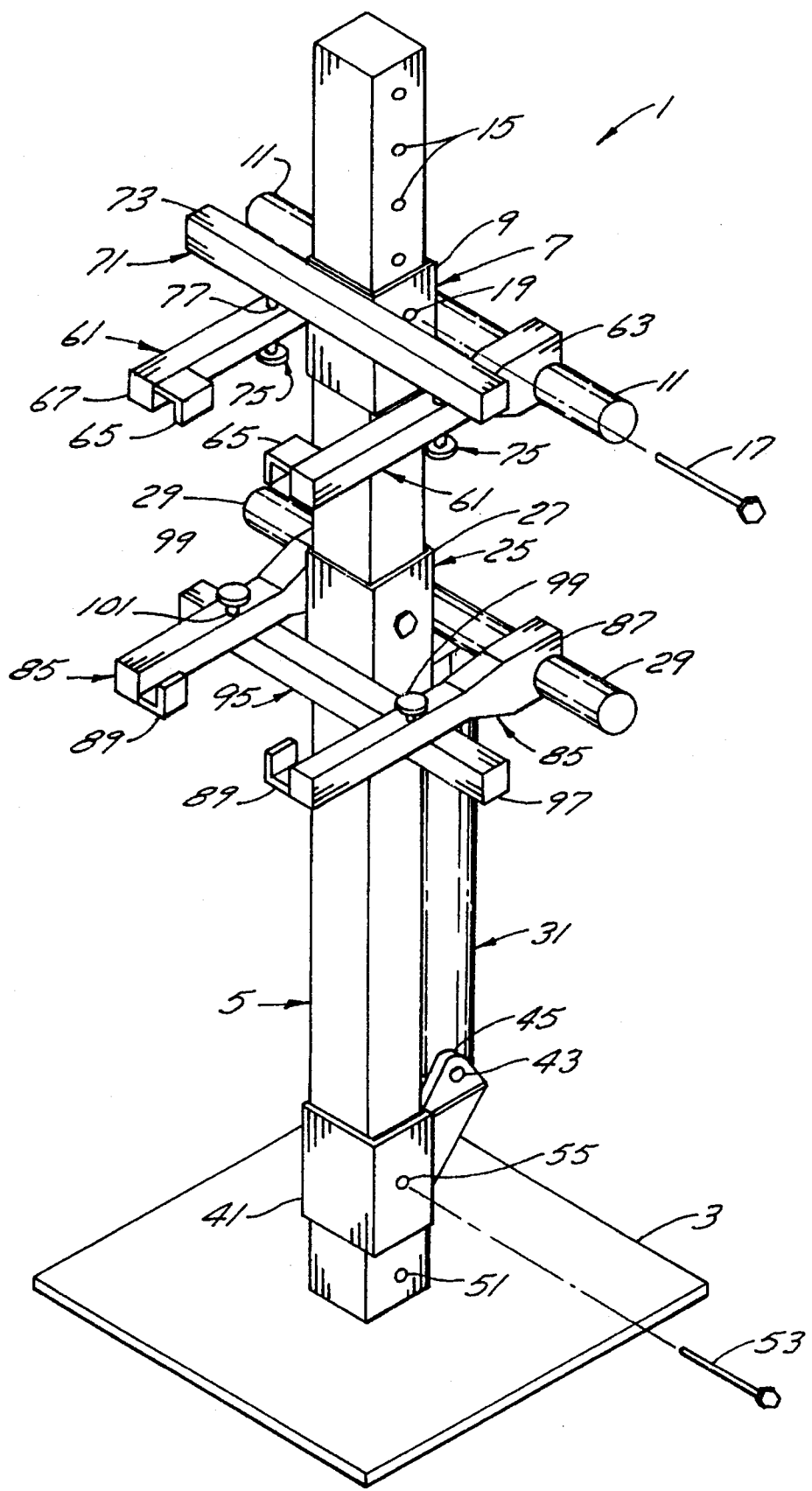
FIG. 2 is a perspective view of the spring compressor in use.

The spring compressor 1 of the present invention, as shown in FIGS. 1 and 2, has a stand or base 3 and a support post 5 extending vertically up from the base 3. The base 3 is wide enough to make the compressor quite stable and the post 5 is about six feet high or slightly higher and preferably square in cross-section.

A top spring mounting means 7 is adjustably, fixedly mounted on the upper part of the post 5. The top spring mounting means 7 has a sleeve 9 to snugly receive the post 5 and a top support bar 11 fixed to the sleeve 9. The top support bar 11 is a cylindrical tube and is horizontal and on the back side of the post 5. A set of vertically spaced-apart, upper, mounting holes 15 are provided on the upper part of the post. A bolt 17, passing through aligned holes 19 in the sides of the sleeve 9, and through one of the upper mounting holes 15, locks the top spring mounting means 7 in desired fixed position on the post 5.

A bottom spring mounting means 25 is slidably mounted on the middle part of the post 5. The bottom spring mounting means 25 has a sleeve 27 for snugly receiving the post 5. A bottom support bar 29 is fixed to the sleeve 27. The bottom support bar 29 is a cylindrical tube. The bottom spring mounting means 25 is slidably mounted on the post 5 with the support bar 29 horizontal and on the back side of the post 5.

A self-contained hydraulic jack 31, such as a "bottle" jack, is part of the spring compressor. The jack 31 is pivotably mounted at its top end 33, via a pivot pin 35, to brackets 37 on the back of the sleeve 27 on the bottom spring mounting means 25. The lower end 39 of the jack 31 can be mounted on the base 3 or the lower part of the post 5. Preferably, the lower end 39 of the jack 31 is pivotably mounted on a bottom sleeve 41 which in turn is slidably mounted on the post 5. The lower end 39 of the jack 31 is mounted by a pin 43 on a bracket 45 on the bottom sleeve 41. The lower part of the post 5 has a lower set of vertically spaced-apart, lower, mounting holes 51. A bolt 53, passing through aligned holes 55 in the sides of the bottom sleeve 27 and one of the holes 51, locks the bottom sleeve 41 in the desired position.

The top spring mounting means 7 has a pair of support arms 61. Each support arm 61 is mounted at one end 63 on the top support bar 11, one on each side of the post 5. Each support arm 61 has coil spring engaging means at its other end. These coil engaging means comprise a downwardly facing spring engaging hook 65 mounted on the inner side of each arm 63 at its free outer end 67. Each arm 63 is rotatable on the support bar 11 in a vertical plane as shown by the arrows "A" and are also slidable on the bar 11 toward and away from each other as shown by the arrows "B". Top stop means 71 are provided for limiting upward rotational movement of the arms 61. The top stop means 71 preferably comprise a top stop bar 73 mounted on the front side of the sleeve 9, parallel to the support bar 11 and slightly above it. The stop bar 73 is slightly shorter than the support bar 11. A stop bolt 75 is provided on each arm 61 under the stop bar 73. Each stop bolt 75 is threaded upwardly through a threaded hole 77 in the arm 61. The free end 79 of the stop bolt 75 abuts the bottom of the stop bar 73 to limit upward movement of the arm 61. The height of the free end 79 of the bolt 75 above the arm 61 can be adjusted. Normally the height is set to have the arms 61 stopped by the stop bar 73 in a generally horizontal position.

The bottom spring mounting means 25 is generally similar to the top spring mounting means 7 and has a pair of bottom support arms 85. Each support arm 85 is mounted at one end 87 on the bottom support bar 29, one on each side of the post 5. Coil spring engaging means are provided at the other end of each arm. The coil engaging means comprises an upwardly facing, spring engaging hook 89 mounted on the inner side of each arm 85 at its free outer end 91. The arms 85 are freely rotatable on the bottom support bar 29 in a vertical plane and are also slidable on the bar 29 toward and away from each other. Bottom stop means 95 are provided for limiting downward rotational movement of the arms 85. The bottom stop means 95 preferably comprises a bottom stop bar 97 mounted on the front of the sleeve 27. The stop bar 97 extends parallel to the support bar 29, is slightly shorter than it, and is slightly below it. A stop bolt 99 is provided on each arm 85 above the stop bar 97. Each stop bolt 99 is threaded downwardly through a threaded hole 101 in the arm 85. The free end 103 of the stop bolt 99 abuts the top of the stop bar 97 to limit downward movement of the arms 85. The height of the free end 103 of the bolt 99 can be adjusted but the arms 85 are normally stopped in a generally horizontal position.

Figure 4:
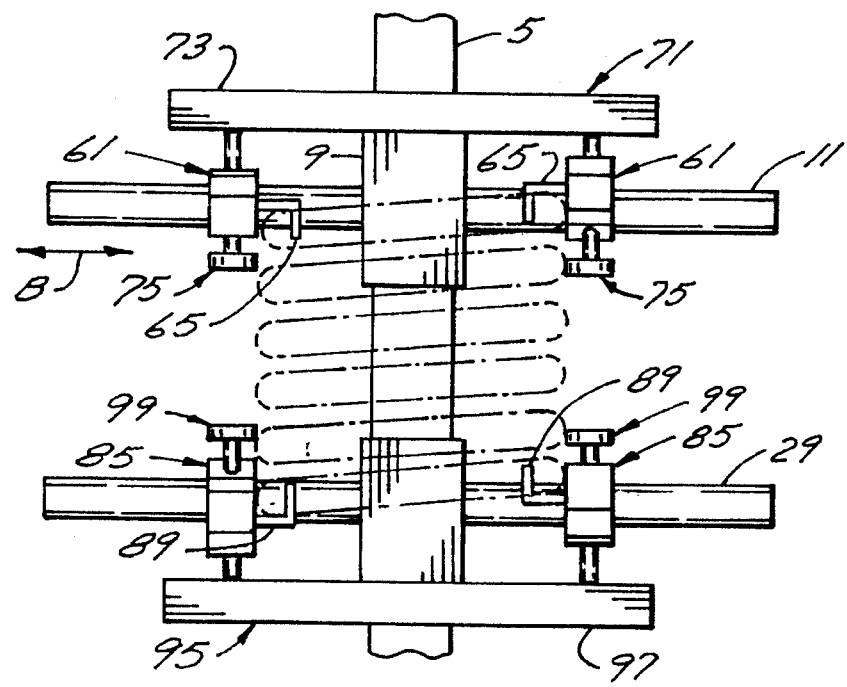
FIG. 4 is a detail front view of the support arms.
Figure 5:
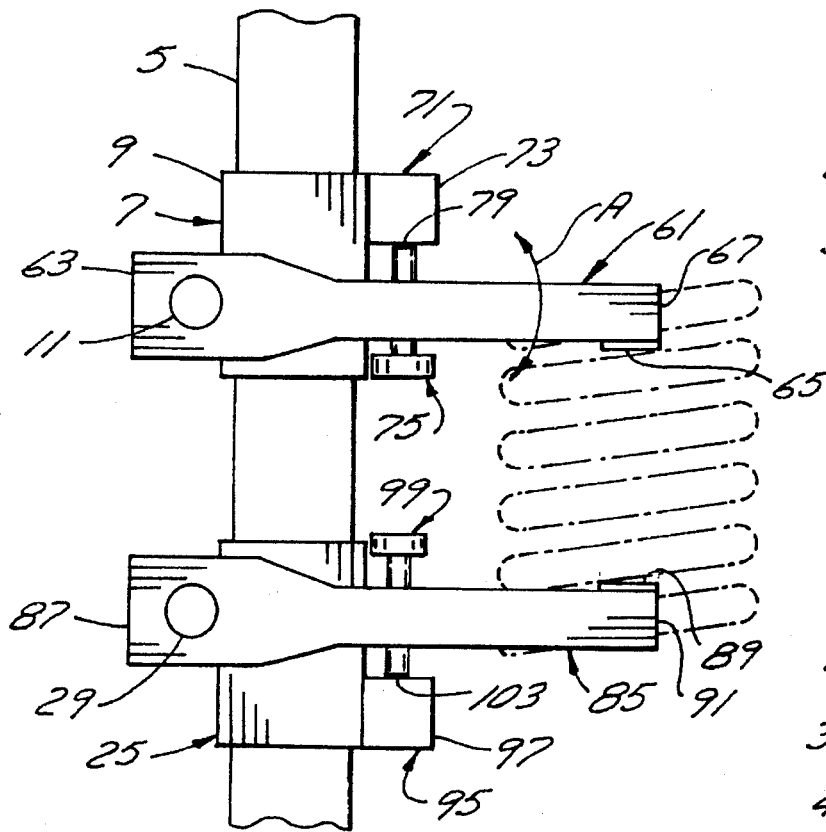
FIG. 5 is a detail side view of the support arms.
Figure 6A:
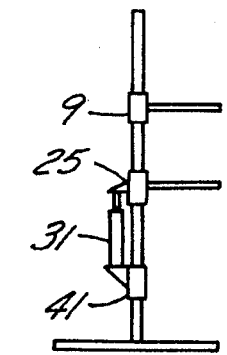
FIGS. 6A and 6B are schematic side views of the compressor showing it in two different working positions.

In use, in replacing a shock absorber in a MacPherson strut assembly, the upper sleeve 9 of the upper spring mounting means 7 is fixed to the post 5 by the bolt 17 in a lower one of the bolt holes 15 as shown in FIGS. 1 and 6A. The bottom sleeve 41, carrying the bottom spring support means 25 by the jack 31, is fixed to the post 5 by bolt 53 in an upper one of the bolt holes 49. The top and bottom spring mounting means 7, 25 are set at a height so that the support arms 61, 85, when in an operative, generally horizontal position, are roughly as far apart as the section of coil spring to be grasped and compressed, and so that they are generally at torso height so that the operator can easily work on the strut assembly. The hanging bottom support arms 85 are now moved outwardly on the support bar 29 past the ends of the bottom stop bar 97, flipped up and moved toward each other on the support bar 29 above the stop bar 97 until the hooks 89 on the arms 85 are about as far apart as the diameter of the spring on the strut assembly being worked on. The arms 85 are then rotated down and allowed to rest, through their stop bolts 99, on the stop bar 97 in a generally horizontal position as shown in FIGS. 2 and 3. Each arm 85 could be adjusted by the stop bolt 99 to take into account the angle of the spring coil "C" as shown in FIG. 4. The strut assembly is now placed on the support arms 85 with opposed portions of a lower spring coil supported by the hooks 89 on the arms. With the strut assembly now sitting on the bottom support arms 85, the top support arms 61 are now grasped, rotated upwardly, and moved inwardly on the top support bar 11 until the hooks 67 on the ends 67 of the arms 61 can be placed on opposed sections of an upper coil of the spring as shown in FIG. 4. The arms 61 are in a generally horizontal position. The stop bolt 75 on each arm could be adjusted to help loosely fit the hooks on the coil spring taking into account the angle of the coils. Once the top hooks 67 are mounted, the jack 31 is operated to move the bottom arms 85 toward the top arms 61. The top arms 61 are prevented from moving upwardly by the top stop bar 73. The section of spring between the arms is compressed. Once the spring has been compressed sufficiently, the shock absorber is loosened from the spring, removed and replaced with another. The jack pressure is then released allowing the spring to decompress to its normal, mounted length on the strut assembly. The top support arms 61 are rotated up and moved to the side and the strut assembly is lifted out of the compressor. If required, the top mounting plate in the assembly can be easily replaced at the same time.

Figure 6B:
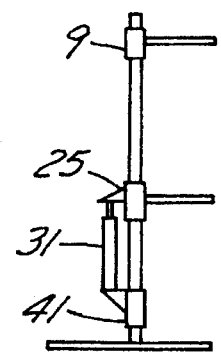

If the spring of the strut assembly has to be replaced for some reason, the compressor can be easily set up to do this. To replace a spring requires a greater working length of the compressor. To achieve this, the top spring mounting means 7 is relocated in an upper one of the upper holes 15 on the top of the post 5 as shown in FIG. 6B. Also the bottom sleeve 41 can be moved down on the post to a lower one of the lower holes 49. The jack 31 is then operated to move the bottom spring mounting means 25 up toward the top spring mounting means 7 until their support arms 61, 85 are apart the required distance to hold a section of spring of the strut assembly. The strut assembly is then mounted between the arms 61, 85, the jack 31 is operated to move the arms together to compress the spring so that the shock can be loosened and removed and then the jack is released to allow the spring to fully decompress. The spring can fully decompress because of the greater working stroke provided. A new spring, fully decompressed, is placed between the arms, the jack is operated to compress the spring, the shock is reinstalled, and the jack is released to allow the strut assembly, with the new partly compressed spring thereon, to be removed.

While the unique support means 7, 29 have been described as being used with a self-contained hydraulic jack, these support means could be used with any form of moving means to move them toward or away from each other.

The application describes the compressor in an upright position. This is obviously the most desirable position and terms such as top and bottom have been used to locate elements on the compressor in this position. However it is conceivable that the tool could also be used in a horizontal position and in this case terms such as "first" and "second", should be used in place of the terms such as "top" and "bottom" in describing and defining the compressor and its elements. Other terms may require obvious change as well to define the compressor and its elements when used in a horizontal working position as compared to a vertical working position.

I claim:

1. A spring compressor having: a base; a single support post extending vertically up from the base; a top, spring mounting means mounted on the upper part of the post a bottom, spring mounting means slidably mounted on the middle part of the post; top, coil spring engaging means mounted on the top spring mounting means and adapted to engage opposed sides of an upper coil of the spring; bottom, coil spring engaging means mounted on the bottom spring mounting means and adapted to engage opposed sides of a lower coil of the spring; and a self-contained hydraulic jack mounted at one end on one of the base and the lower part of the post and at its other end to the bottom spring mounting means and operable to move the bottom spring mounting means toward the top spring mounting means to compress a spring between the top and bottom coil spring engaging means.

2. A spring compressor as claimed in claim 1 including a bottom sleeve mounted on the lower part of the post, the jack being mounted at its one end to the bottom sleeve.

3. A spring compressor as claimed in claim 1 wherein the top spring mounting means can be mounted in one of several vertically spaced apart positions on the upper part of the post depending on the type of job required, or the size of spring.

4. A spring compressor as claimed in claim 2 wherein the top spring mounting means can be mounted in one of several vertically spaced apart positions on the upper part of the post depending on the type of job required, or the size of spring.

5. A spring compressor as claimed in claim 2 wherein the bottom sleeve can be mounted in one of several vertically spaced apart positions on the lower part of the post depending on the type of job required, or the size of spring.

6. A spring compressor as claimed in claim 5 wherein the top spring mounting means can be mounted in one of several vertically spaced apart positions on the upper part of the post.

7. A spring compressor as claimed in claim 1 wherein the coil spring engaging means comprise hooks on the top and bottom spring mounting means to engage a section of the spring between them.

8. A spring compressor having: a vertical support post; a top spring mounting means fixed on the post; a bottom spring mounting means slidably mounted on the post; the top spring mounting means having a top support bar extending transverse to the post; a pair of top support arms on the top support bar, one on either side of the post, the support arms slidable toward and away from each other on the top support bar; the bottom spring mounting means having a bottom support bar extending transverse to the post; a pair of bottom support arms on the bottom support bar, one on either side of the post, the support arms slidable toward and away from each on the bottom support bar; the top and bottom support arms having coil spring engaging means on their outer ends for engaging a section of a coil of a spring; and moving means, when a section of the spring is engaged, for moving the bottom spring mounting means toward the top spring mounting means to compress the section of the spring.

9. A spring compressor as claimed in claim 8 wherein the coil spring engaging means comprise a hook on each arm, the hooks on the bottom arms facing the hooks on the top arms.

10. A spring compressor as claimed in claim 9 wherein at least one of the sets of support arms are rotatable on their support bar and stop means are provided for limiting rotation of the arms and maintaining them generally transverse to the post during spring compression.

11. A spring compressor as claimed in claim 9 wherein each set of support arms is rotatable on its support bar and stop means are provided for limiting rotation of the arms and maintaining them generally transverse to the post during spring compression.

12. A spring compressor as claimed in claim 11 wherein the stop means for limiting rotation of the top arms comprise a stop bar on the top spring mounting means located in front of and slightly above the top support bar and the stop means for limiting rotation of the bottom arms comprise a bottom stop bar on the bottom spring mounting means located in front of and slightly below the bottom support bar.

13. A spring compressor as claimed in claim 12 including an adjustment screw in each top arm, each adjustment screw extending upwardly to abut against the top stop bar when the spring is being compressed; and an adjustment screw in each bottom arm, each adjustment screw extending downwardly to abut against the bottom stop bar.

14. A spring compressor as claimed in claim 8 including a sleeve on the top spring mounting means, the sleeve slidably mounted on the post, and means for fixing the sleeve at a selected position on the upper part of the post.

15. A spring compressor as claimed in claim 8 including a bottom sleeve slidably mounted on the post, the lower end of the moving means fixed to the bottom sleeve, and means for fixing the sleeve at a selected position on the lower part of the post.

16. A spring compressor as claimed in claim 8 including a bottom sleeve slidably mounted on the post, the lower end of the moving means fixed to the bottom sleeve, means for fixing the sleeve at a selected position on the lower part of the post, a sleeve on the top spring mounting means, the sleeve slidably mounted on the post, and means for fixing the sleeve at a selected position on the upper part of the post.

17. A spring compressor as claimed in claim 16 wherein the moving means comprise a self-contained hydraulic jack mounted between the bottom sleeve and the bottom spring mounting means.

* * * * *